(12) United States Patent
Toms

(10) Patent No.: US 7,799,394 B2
(45) Date of Patent: Sep. 21, 2010

(54) CONTAINER WITH INSULATIVE LABEL

(75) Inventor: Ray Alan Toms, Golden, CO (US)

(73) Assignee: Millercoors, LLC, Chicago, IL (US)

( * ) Notice: Subject to any disclaimer, the term of this patent is extended or adjusted under 35 U.S.C. 154(b) by 175 days.

(21) Appl. No.: 11/559,766

(22) Filed: Nov. 14, 2006

(65) Prior Publication Data

US 2008/0113127 A1    May 15, 2008

(51) Int. Cl.
B32B 1/02      (2006.01)
B32B 1/08      (2006.01)
B32B 27/00     (2006.01)
B32B 27/08     (2006.01)

(52) U.S. Cl. .................... 428/34.1; 428/35.7; 428/35.9; 428/36.7; 428/36.9; 428/40.1

(58) Field of Classification Search ................ 428/34.1, 428/35.7, 35.9, 36.7, 36.9, 40.1
See application file for complete search history.

(56) References Cited

U.S. PATENT DOCUMENTS

| | | | |
|---|---|---|---|
| 3,947,277 A * | 3/1976 | Carnahan et al. | 106/31.64 |
| 4,268,567 A | 5/1981 | Harmony | |
| 4,889,234 A | 12/1989 | Sorensen et al. | |
| 4,972,175 A * | 11/1990 | MacPherson | 340/550 |
| 5,289,785 A * | 3/1994 | MacPherson et al. | 109/42 |
| D362,789 S | 10/1995 | Sutton | |
| 5,792,536 A | 8/1998 | Whipp | |
| 5,851,338 A | 12/1998 | Pushaw | |
| 5,955,188 A | 9/1999 | Pushaw | |
| 6,077,597 A | 6/2000 | Pause | |
| 6,150,013 A | 11/2000 | Balaji et al. | |
| 6,207,738 B1 | 3/2001 | Zuckerman et al. | |
| 6,217,993 B1 | 4/2001 | Pause | |
| 6,230,968 B1 | 5/2001 | Varadarajan | |
| 6,503,976 B2 | 1/2003 | Zuckerman et al. | |
| 6,514,362 B1 | 2/2003 | Zuckerman et al. | |
| 6,536,657 B2 * | 3/2003 | Van Handel | 229/403 |

(Continued)

FOREIGN PATENT DOCUMENTS

EP         0825952         10/2003

(Continued)

OTHER PUBLICATIONS

"An Industry First Outlast Demonstrates Versatility of Technolgy; Collaborates with Smyth Companies on New Cold WrapTM Label"; Outlast New Release, Boulder, CO, May 16, 2006, 2 pages.

*Primary Examiner*—Marc A Patterson
(74) *Attorney, Agent, or Firm*—Sheridan Ross PC

(57) ABSTRACT

An insulative label is provided for a beverage container to reduce heat transfer, particularly heat transfer by conduction from a consumer's hand to the beverage container. The label comprises a dual-ply construction, with a grid pattern placed between the layered materials. Preferably, the label comprises a film base layer secured to the container, the grid pattern comprising an ink and varnish mixture printed over the film base layer, and a laminate top layer secured to the film base layer. Air is trapped in the gaps or spaces between the protrusions created by the grid pattern, and the trapped air insulates the container. The label has a very thin profile, thereby not perceptibly changing the appearance of the label or the container.

12 Claims, 2 Drawing Sheets

U.S. PATENT DOCUMENTS

| | | |
|---|---|---|
| 6,620,281 B1 | 9/2003 | Sommers |
| 6,659,507 B2 | 12/2003 | Banahan |
| 6,660,667 B2 | 12/2003 | Zuckerman et al. |
| 6,689,466 B2 | 2/2004 | Hartmann |
| 6,793,856 B2 | 9/2004 | Hartmann et al. |
| 7,081,286 B2 | 7/2006 | Benim et al. |
| 7,108,906 B2 | 9/2006 | Benim et al. |
| 2003/0085565 A1 | 5/2003 | Asay |
| 2005/0153091 A1 | 7/2005 | Challoner et al. |
| 2005/0208245 A1 | 9/2005 | Farha |
| 2006/0032761 A1 | 2/2006 | Oguri |

FOREIGN PATENT DOCUMENTS

WO    WO 96/36537    11/1996

* cited by examiner

CONTAINER WITH INSULATIVE LABEL

FIELD OF THE INVENTION

The present invention relates to labels applied to containers such as bottles, and more particularly, to a label that insulates the container, thereby reducing heat transfer to maintain the temperature of the beverage within the container.

BACKGROUND OF THE INVENTION

Beverages such as beer and soda are commonly made available to consumers in beverage bottles. Beer is preferably kept refrigerated prior to consumption, since most consumers prefer to drink cold beer. Although a beverage bottle is a convenient container to distribute the beverage to consumers, the beverage within the bottle quickly warms after it has been removed from its refrigerated or cooled environment.

Heat transfer from the environment to the contents of the container occur in different ways. One significant mode of heat transfer is by conduction. If an object having a higher temperature than the beverage contacts the bottle, heat transfer will occur, thus warming the beverage within the bottle. It is well known that when a consumer holds a beverage bottle, heat will be conducted from the consumer's hand to the bottle, and the beverage will quickly warm. Other modes of heat transfer can also occur, such as heat transfer by convection from the surrounding air, or heat transfer by radiation from exposure to sunlight.

In order to address the problem of heat transfer with respect to beverage bottles, there are a number of references that provide various means to insulate a beverage container in order to reduce heat transfer, and maintain the beverage at a desired temperature. One reference includes U.S. Pat. No. 4,268,567. This reference discloses an elongated sheet of cross-linked polyethylene foam which can be imprinted with conventional printing inks. The foam sheet is wrapped around the surface of the container to be insulated. A strip of adhesive is used to connect the ends of the foam sheet.

U.S. Pat. No. 6,620,281 discloses an insulating label comprising a layer of ink placed on the face of a paper stock substrate, and an adhesive layer disposed on the backside of the paper stock substrate. A thin, waterproof layer of foam is attached to the adhesive layer of the paper stock substrate. The printed face of the label is protected by a clear film or coating. The label can be used either as an aftermarket wrap, or as a label that is an integral part of the container as it is produced from the manufacturer.

Other references that disclose labels with insulating characteristics include the U.S. Pat. Nos. 5,792,536 and 4,889,234.

Although labels having insulation features are known, there is still a need to provide an insulating label that is inexpensive to manufacture, and can be easily secured to the container when shipped from the manufacturer. Additionally, it is desirable to provide a label that does not substantially alter the appearance or size of the container. It is also desirable to provide insulation in a manner that does not detract from the artwork or printing on the label.

SUMMARY OF THE INVENTION

In accordance with the present invention, an insulative label is provided that may be applied to a container in order to insulate the container from various modes of heat transfer, particularly heat transfer by conduction that may occur when a consumer's hand contacts the container. In accordance with a preferred embodiment of the present invention, the label comprises a multi-layered configuration, taking advantage of air gaps between the layers to provide the insulation effect. More specifically, a film base layer attaches to an exterior surface of the container. Placed over the film base layer is a grid pattern comprising an ink and varnish mixture. Preferably, the grid pattern is applied to the film base layer by printing. The ink and varnish mixture is especially adapted for application by known printing processes. Once applied, the grid pattern extends away from the film base layer; preferably about 2-4 thousands of an inch. The grid pattern is allowed to dry, and then a laminate top layer is placed over the printed grid pattern. The top laminate layer has a coating of adhesive that is disposed on its border allowing the top laminate layer to be secured to the underlying film base layer. The grid pattern has a number of irregular gaps or spaces. The air trapped in these gaps serves as a layer of insulation to help prevent heat transfer, particularly by conduction. Another way in which to describe the ink and varnish mixture which extends away from the film base layer is to characterize it as a honeycomb configuration wherein there are a plurality of separate cells, and between the cells are gaps that enable air to be trapped therein when the top laminate layer is applied. The laminate top layer may be preprinted with the desired product identification, or the top laminate layer may be printed after it has been secured to the grid pattern.

Particular advantages of the present invention include the provision of an insulative label that is very thin, non-obtrusive, and is easily incorporated within a label manufacturing process for use with high-speed labeling and filling lines. Ultimately, the insulative characteristics provided by the label of the present invention are economical and easy to manufacture.

DETAILED DESCRIPTION

Figure 1:
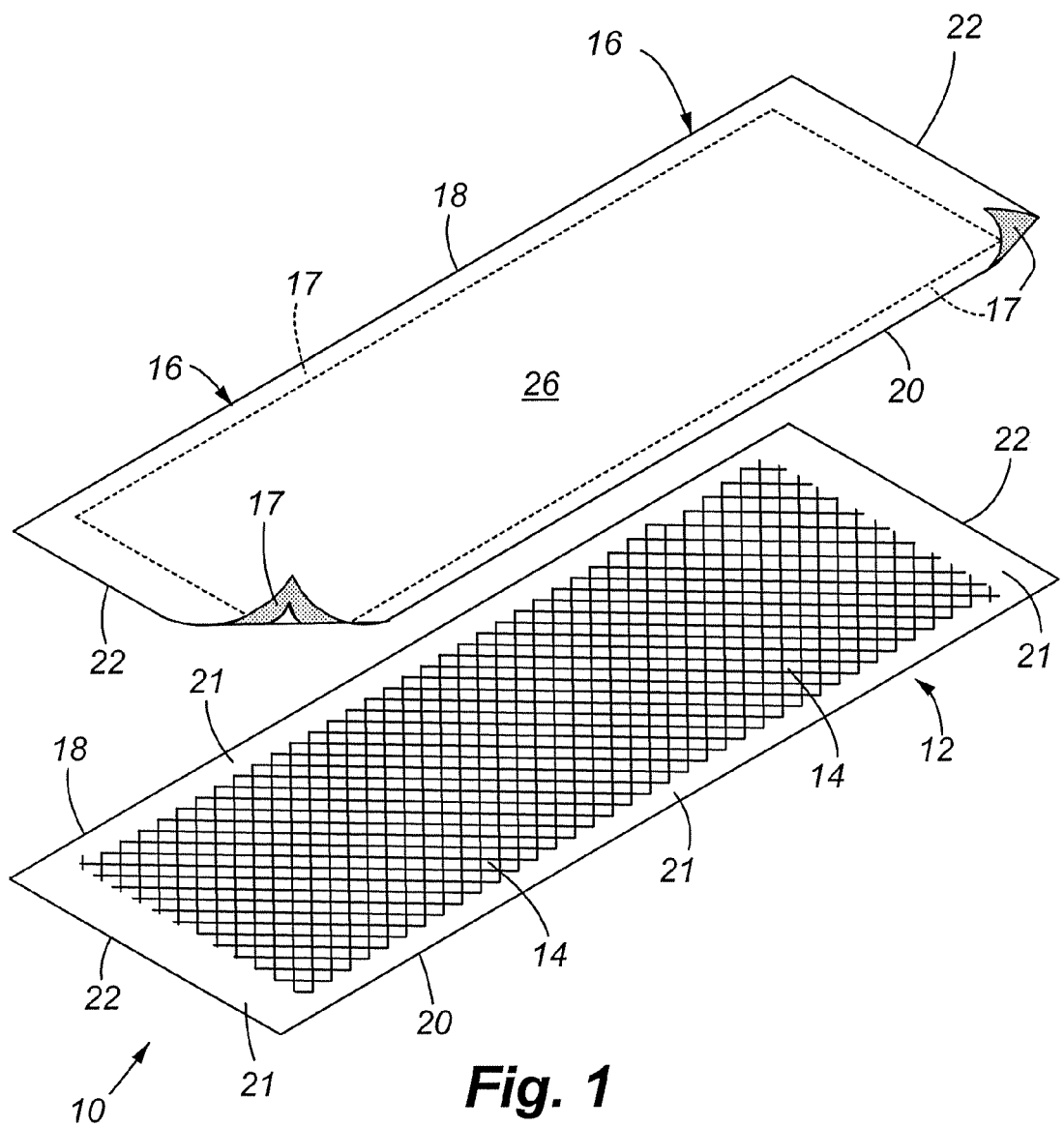
FIG. 1 is an exploded perspective view of the insulative label of the present invention, illustrating the three primary components, namely, a film base layer, a printed grid pattern, and a top laminate layer.

FIG. 1 illustrates a preferred embodiment of the present invention in the form of a multi-layered, insulative label 10. As shown, the three primary components or parts of the label include a film base layer 12, a grid pattern 14 applied to the base layer, and a top laminate layer 16 that is applied over the grid pattern 14. In the manufacturing of the label, the film base layer 12 undergoes a printing process wherein the grid pattern 14 is applied to the film base layer 12. The film base layer 12 preferably comprises an ink and varnish mixture. The mixture has a degree of viscosity that enables the mixture when applied to maintain the honeycomb configuration wherein a plurality of gaps or spaces remain between the groups or cells of the applied mixture.

Figure 2:
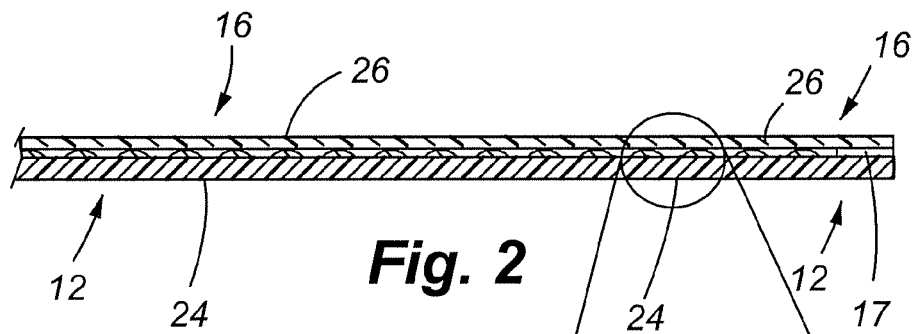
FIG. 2 is a partial cross-section of the label of FIG. 1.
Figure 3:
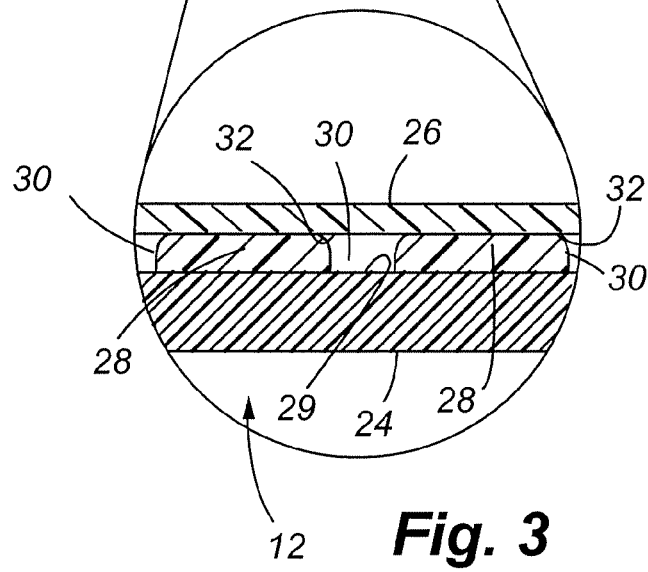
FIG. 3 is a greatly enlarged portion of FIG. 2.

Also referring to FIGS. 2 and 3, the label 10 may be further described as including a first side edge 18, a second side edge 20, and transverse edges 22 that abut one another when the label is wrapped around a container. An adhesive border 17 is applied to the facing surface of the top laminate layer 16 to secure the top laminate layer 16 to the film base layer 12. As also shown, the film base layer 12 has a peripheral edge 21 with no grid pattern thereon, which allows the adhesive 17 to directly contact the film base layer 12. As best seen in FIGS. 2 and 3, the grid pattern 14 comprises a plurality of irregular shaped and sized protrusions 28 that extend beyond the exposed surface 29 of the film base layer 12. Accordingly, a plurality of gaps or spaces 30 reside between exposed surface 29 and the lower facing surface 32 of the top laminate layer 16. The formulation of the ink and varnish mixture may be provided to enable the protrusions 28 to extend away from the surface 29 the desired amount. It has been found that one preferable size for the grid pattern is approximately 2-4 thousands of an inch.

With respect to characterizing the grid pattern as a honeycomb configuration, the protrusions 28 may be defined as cells, and the gaps or spaces 30 are found between the individual cells.

The upper surface 26 may be printed to recite the product information as desired. The lower surface 24 of the label is secured to the exterior surface of the container, such as by adhesive applied to surface 24. As shown in FIGS. 2 and 3, the upper surface 26 is smooth, as well as the lower surface 24. When applied to the container as shown, the upper surface 26 and lower surface 24 extend substantially parallel to one another.

Figure 4:
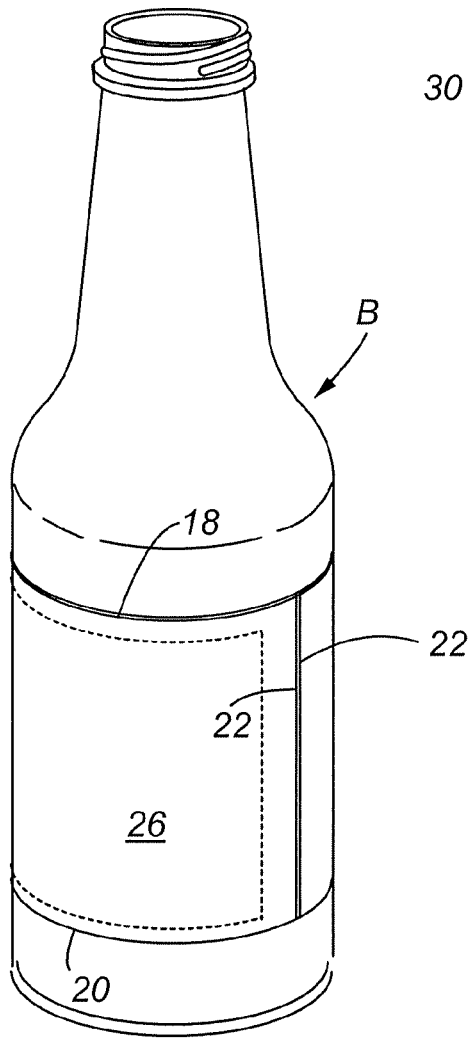
FIG. 4 is a perspective view of a beverage bottle having the label of the present invention applied thereto.

The label 10 is shown applied to a bottle B in FIG. 4. The label has a non-obtrusive appearance since it maintains a minimum thickness; therefore, the label does not change the general overall appearance of the bottle as compared to traditional labels. As discussed above with the prior art, use of foam layers or other materials may make a label appear bulky and otherwise unattractive to a consumer. Although not visually perceptible by the consumer, the grid pattern 14 in combination with the top laminate layer 16 and lower film base layer 12 provide an effective way to insulate the container and to particularly reduce heat transfer by conduction.

While the foregoing invention has been described with respect to a preferred embodiment, it shall be understood that various other changes and modifications may be made to the invention which fall within the spirit and scope of the present invention, in accordance with the scope of the claims appended hereto.

What is claimed is:

1. An insulative label for insulating a container, comprising:
    a film base layer having a lower surface secured to an exterior surface of the container;
    a grid printed over said film base layer, said grid comprising protrusions extending from said film base layer, said grid comprising a mixture of ink and varnish, wherein the mixture has a degree of viscosity enabling said protrusions to extend from said film base layer a desired distance;
    a top laminate layer secured to said film base layer and said grid pattern positioned between said film base layer and said top laminate layer, wherein gaps are located between the protrusions and between the top laminate layer and film base layer to form a thermally insulating air barrier, and wherein said top laminate layer and said film base layer extend between at least some of said protrusions, and said top laminate layer and said film base layer not being in contact with one another in the gaps, wherein said gaps therefore extend continuously between said layers;
    a product identification printed over an exposed surface of said top laminate layer; and
    said lower surface and said exposed surface are smooth and extend substantially parallel to one another.

2. A label, as claimed in claim 1, wherein:
    said protrusions extend away from said film base layer between about 2 to 4 thousandths of an inch.

3. A label, as claimed in claim 1, wherein:
    adhesive is secured to a periphery of a facing surface of said top laminate layer for securing said top laminate layer to said film base layer.

4. A label, as claimed in claim 1, wherein:
    said film base layer has a periphery with no grid formed thereon for enhancing contact of said adhesive of said top laminate layer with said film base layer.

5. In combination, a beverage container and label, said combination comprising:
    (a) a beverage container having a cylindrical sidewall;
    (b) a label secured to said beverage container, said label having a cylindrical shape when applied to said beverage container including opposing first and second side edges spaced from one another and extending horizontally across the beverage container, said label further comprising:
        (i) a film base layer;
        (ii) a grid printed over said film base layer, said grid comprising protrusions extending from said film base layer, said grid comprising a mixture of ink and varnish, wherein the mixture has a degree of viscosity enabling said protrusions to extend from said film base layer a desired distance;
        (iii) a top laminate layer secured to said film base layer and said grid pattern positioned between said film base layer and said top laminate layer, wherein gaps in said grid are located between said protrusions and between said base layer and said top laminate layer to form a thermally insulating air barrier, said top laminate layer and said film base layer extending between at least some of said protrusions, and said top laminate layer and said film base layer not being in contact with one another in the gaps, wherein said gaps therefore extend continuously between said layers; and
    a product identification printed over said top laminate layer.

6. The combination as claimed in claim 5, wherein:
    said protrusions extend away from said film base layer between about 2 to 4 thousandths of an inch.

7. The combination as claimed in claim 5, wherein:
    adhesive is secured to a periphery of a facing surface of said top laminate layer for securing said top laminate layer to said film base layer.

8. The combination as claimed in claim 5, wherein:
    said film base layer has a periphery with no grid formed thereon for enhancing contact of said adhesive of said top laminate layer with said film base layer.

9. An insulative label for insulating a container, comprising:
    a film base layer having a lower surface secured to an exterior surface of the container;
    a honeycomb configuration printed over said film base layer, said honeycomb configuration comprising protrusions extending from said film base layer, said honeycomb configuration comprising a mixture of ink and varnish, wherein the mixture has a degree of viscosity enabling said protrusions to extend from said film base layer a desired distance; and
    a top laminate layer secured to said film base layer, said top laminate layer having an exposed surface for receiving printing, said honeycomb configuration pattern positioned between said film base layer and said top laminate layer, wherein gaps in said honeycomb configuration are located between said protrusions and between said base layer and said top laminate layer to form a thermally insulating air barrier, and said top laminate layer and said film base layer extend between said protrusions and not being in contact with one another in said gaps, wherein said gaps therefore extend continuously between said layers and wherein said lower surface and said exposed surface are smooth and extend substantially parallel to one another.

10. A label, as claimed in claim 9, wherein:
said protrusions extend away from said film base layer between about 2 to 4 thousandths of an inch.

11. A label, as claimed in claim 9, wherein:
adhesive is secured to a periphery of a facing surface of said top laminate layer for securing said top laminate layer to said film base layer.

12. A label, as claimed in claim 9, wherein:
said film base layer has a periphery with no honeycomb configuration formed thereon for enhancing contact of said adhesive of said top laminate layer with said film base layer.

* * * * *